United States Patent [19]

Steel

[11] 3,940,896
[45] Mar. 2, 1976

[54] SOLAR RADIATION AND GLARE SCREEN AND METHOD OF MAKING SAME

[76] Inventor: John F. Steel, 1469 N. Ocean Blvd., Palm Beach, Fla. 33480

[22] Filed: Nov. 21, 1973

[21] Appl. No.: 417,914

[52] U.S. Cl. ............... 52/307; 52/616; 160/107; 240/93
[51] Int. Cl.² .......................................... F21V 13/04
[58] Field of Search ............ 52/306, 307, 308, 616; 160/107; 240/160 R, 93

[56] References Cited
UNITED STATES PATENTS

| | | | |
|---|---|---|---|
| 1,848,190 | 3/1932 | Morgan | 52/616 |
| 2,382,566 | 4/1945 | Heckman | 52/616 |
| 2,689,387 | 9/1954 | Carr | 52/616 |
| 2,745,150 | 5/1956 | Warns | 52/616 |
| 2,749,794 | 6/1956 | O'Leary | 160/166 R |
| 3,022,549 | 2/1962 | Cummings | 52/616 |
| 3,193,434 | 7/1965 | Weiss | 52/307 |
| 3,324,620 | 6/1967 | Bequena | 52/616 |
| 3,473,534 | 10/1969 | Sida | 160/238 |
| 3,590,544 | 7/1971 | Shepherd | 52/573 |

*Primary Examiner*—Frank L. Abbott
*Assistant Examiner*—Henry Raduazo
*Attorney, Agent, or Firm*—Pennie & Edmonds

[57] ABSTRACT

A sun reflector formed by a carrier of transparent sheet material and internal louvers for use in a window panel is disclosed. The louvers are inserted across the width of the carrier and on equally spaced centers along its length. The louvers are received by the carrier at an angle acute to the plane of the surface. The louvers are formed of individual segments, each of which is equidistantly spaced from adjacent louver segments with the outer segments being spaced from the sides of the sheet material. The louver segments are encased by the sheet material.

6 Claims, 4 Drawing Figures

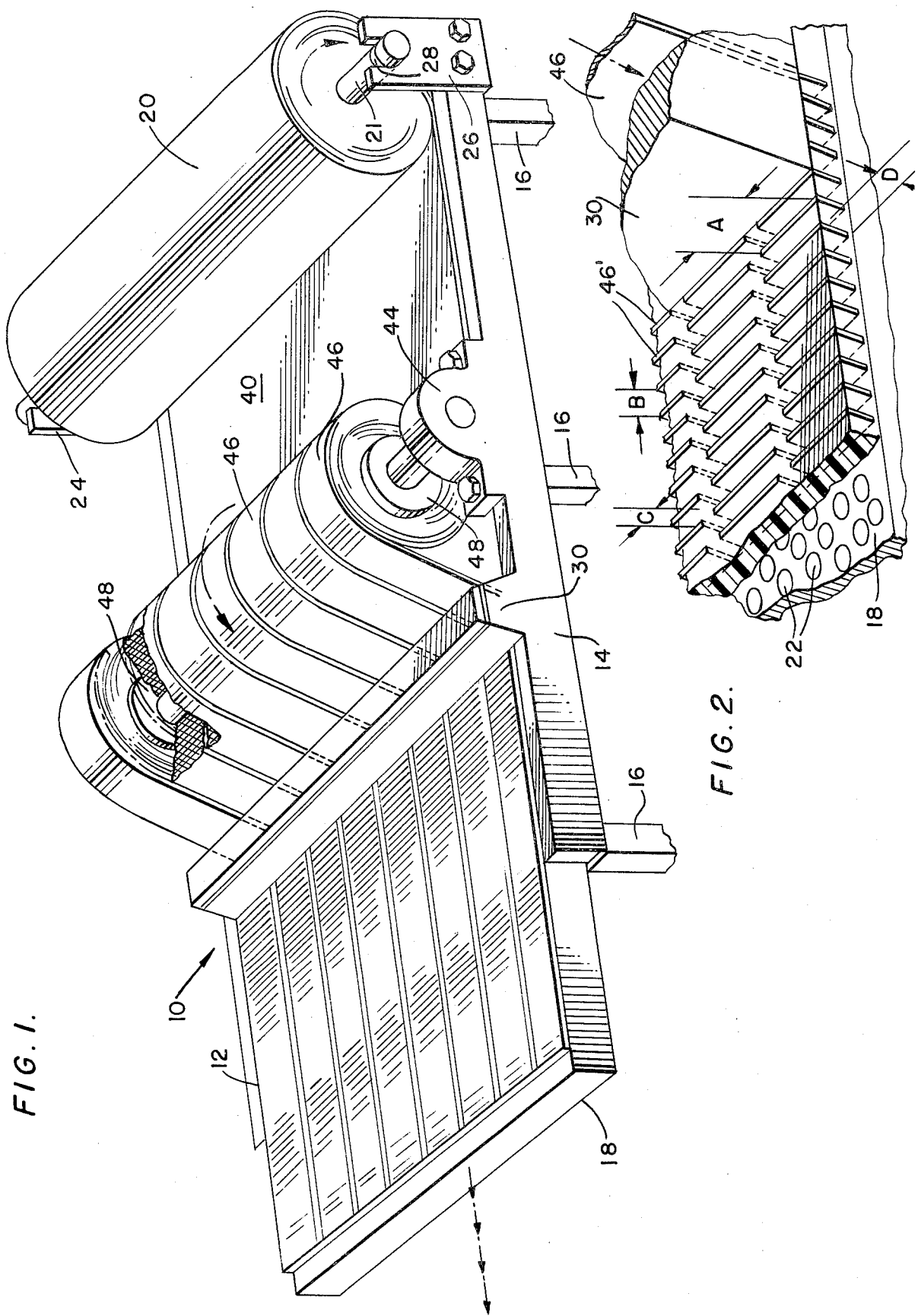

SOLAR RADIATION AND GLARE SCREEN AND METHOD OF MAKING SAME

The present invention relates to sun reflectors in the form of a sheet material carrier having internal louvers and the method for forming the same. The sheet material with the encased louvers has particular utility as one lamina of a laminated window panel and serves as a medium to reflect the sun's rays from the window panel without affecting visibility through the panel.

BACKGROUND OF THE INVENTION

The prior art includes louvered screens which take the form of horizontal metal louvers supported between metal uprights or mullions. The mullions are essential to hold the louvers fixed in a horizontal position. While such screens are effective to reflect the rays of the sun, they prove impractical to use and suffer from certain disadvantages.

In this connection, if the metal louvered sun screen is placed adjacent a window, it rapidly accumulates dirt which impairs or blocks visibility. So as not to unduly impair visibility through the screen the louvers and mullions are quite thin. Thus cleaning is a difficult undertaking and the louvers and mullions are easily bent or broken. To overcome this problem of cleaning, such screens have been suspended between two spaced sheets of glass to form a window. If the sheets are not bonded together and the space evacuated condensation may occur between the sheets to impair visibility. If the sheets are bonded together to enclose the screen the problem of condensation may be supplanted by problems introduced because of the wide variance between the coefficients of expansion and contraction of metal and glass. Thus, on a very cold day, for example, the contraction of the metal screen, compared to the relatively small contraction of the glass may be sufficient to cause the glass to shatter.

An additional disadvantage of the prior art metal screens resides in the fact that because of their size the mullions which support the louvers must be spaced fairly closely. For example, the mullions may be spaced on the order of one inch apart to introduce stability to the louvers causing the louvers to remain horizontal throughout their length. The mullions impair visibility. To this end, the mullions present to the eye a number of opaque vertical strips across a person's view. This arrangement is annoying to one looking through the window structure, and places severe limitations on architects in their attempts to make attractive window designs.

Because of the aforementioned problems and objections to this form of screen including mullions and supported louvers attempts have been made to form louvers in glass or in transparent plastic sheets. Generally, such efforts have been directed to forming in a glass panel over one surface thereof a family of parallel grooves, or in sawing parallel grooves in one surface of a plastic sheet, and then depositing an opaque material in such grooves to provide the desired lower effect. The depth of the grooves must be restricted in order not to unduly weaken the panel. Therefore, great pains must be taken in the production of such structures to avoid or lessen breakage and marring of the same. Accordingly, these structures are extremely difficult, time-consuming and costly to produce.

A further example of prior art louvered screening is disclosed in U.S. Pat. No. 2,980,567 which issued to me on Apr. 18, 1961. Briefly, a louvered sheet forming a sun screen to be included in a panel is disclosed as being formed of a multiplicity of individual relatively thin sheets, approximately 0.005 inches in thickness, which are bonded together under conditions of heat and pressure. To this end, a stack of sheets is bonded by a press apparatus including a pair of platens which close about the stack. The sheets are formed of transparent plastic, such as cellulose acetate butyrate. One surface of each sheet contains a family of spaced (on approximately 0.062 inch centers) and parallel opaque lines extending between the edges of the sheet and across the length. The lines are applied in a layer approximately equal to one-half the thickness of the sheet and approximately 0.010 inches in width.

The spacing of the lines corresponds to the desired louver separation. The louver separation is obtained by predetermined displacement of the individual sheets of the stack relative to adjacent sheets. The louver through the bonded sheet, formed by the several opaque lines, will reside at some angle from the vertical as determined by the sheet displacement. The bonded sheet is in turn bonded to a pair of panes to form an optical panel. For further explanation, attention may be directed to the aforementioned patent.

The bonded sheet product having spaced louvers within the sheet has been widely accepted within the industry for use as a reflector in a window panel. While the bonded sheet product is widely accepted within the industry it has been found that added cost of the product has been introduced in the manufacturing procedure by the necessity of exercise of extreme care in material selection, the observance of criticality in the disposition of the several sheets to be bonded, and in the initial application of the opaque lines to the sheets. Particularly, the several sheets need to be perfectly flat. Otherwise the final bonded sheet will contain ridges to militate against proper bonding to the outer glass layers. The family of parallel spaced opaque lines on each sheet must be deposited precisely. And the inclination of the several sheets preparatory to the bonding process and the formation of the clear plastic sheet with miniature louvers therein must be provided with precision.

BRIEF DESCRIPTION OF THE INVENTION

The present invention overcomes the problems and disadvantages of the prior art heretofore noted both in connection with the formation of metal louvers and in the formation of the bonded louvered sheet according to the method of its manufacture as described particularly in my earlier patent.

In one aspect, the present invention is directed, with more economy and consistency of product, to the manufacture of a louvered sheet which displays at least the efficiency of prior art products of similar nature and manufacture. Thus, the invention includes certain operations which are carried out on a flat sheet of plastic material which in the ultimate product resides between a pair of panes thereby to form a window panel. Particularly, the sheet of predetermined width and length is passed to and stationarily received by the bed of a punch press. The press includes at least one punching die head oriented above and movable along the bed and the sheet thereon. Each die head is formed by a plurality of die head elements spacedly positioned across the head. Material for forming a louver is passed to the die head. The material is sheared to predetermined length and upon each actuation of the head elements the predetermined length is inserted edgewise into the sheet material carrier. To compensate for thermal changes causing expansion or contraction of the louver, the louver material is carried by a plurality of rolls mounted on a single shaft. The rolls are spaced one from the other. Each width of material is passed to a single element of the die head which inserts the material segment into the carrier with the same spacing. The actuations follow a predetermined stepped advance of the die head relative to the bed or vice versa until louvers are inserted throughout the surface area. The sheet material will preferably be thicker than the width of the louver irrespective of the angle of insertion. Thereafter, a further layer of sheet material is applied to the penetrated surface. The thickness of the applied layer will approximately be equal to the unpenetrated thickness of the original material. The louvered sheet may be bonded to outer panes to form a window panel.

The sheet provides a cushion and serves to positively encase louver segments across the width and throughout the length of the sheet. The sheet because of the spacing accommodates possible expansion or contraction of the louver caused by thermal conditions. The method is a positive and economical operation. The product may be replicated over and over again.

The present invention contemplates in a further aspect the insertion of louver segments into a sheet material of a thickness such that the louver penetrates and cores the sheet material upon passage to the lower surface. Additional layers of sheet material will be received to encase the louvers. The louver sheet similarly is bonded to outer panes to form a window panel.

In the aforementioned procedures the louver material is passed to the die head in the direction of the stepping advance. It is contemplated, also, that the material may be passed along a path longitudinal of the die head. In this connection, the louver material will have been cut to desired width and is sheared by the die head lengthwise at a plurality of locations in order to insert the louver segments, as discussed. In either case, the louver is inserted into the sheet material at an angle acute to the plane of the sheet material surface.

As a further aspect, the present invention contemplates the use of multiple die heads which are equidistantly spaced along the length of the bed. To this end, the insertion operation may be completed in some fraction of the time required for process completion utilizing a single die head.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

The accompanying drawings form a part of the present invention. By these drawings, which illustrate a preferred form of the invention, FIG. 1 is a view in perspective of the apparatus for punching louver segments into a sheet material carrier;

FIG. 2 is an enlarged partial view in perspective of the sheet material carrier and illustrating the disposition of the louver segments;

DESCRIPTION OF THE PREFERRED EMBODIMENT

Figure 3:
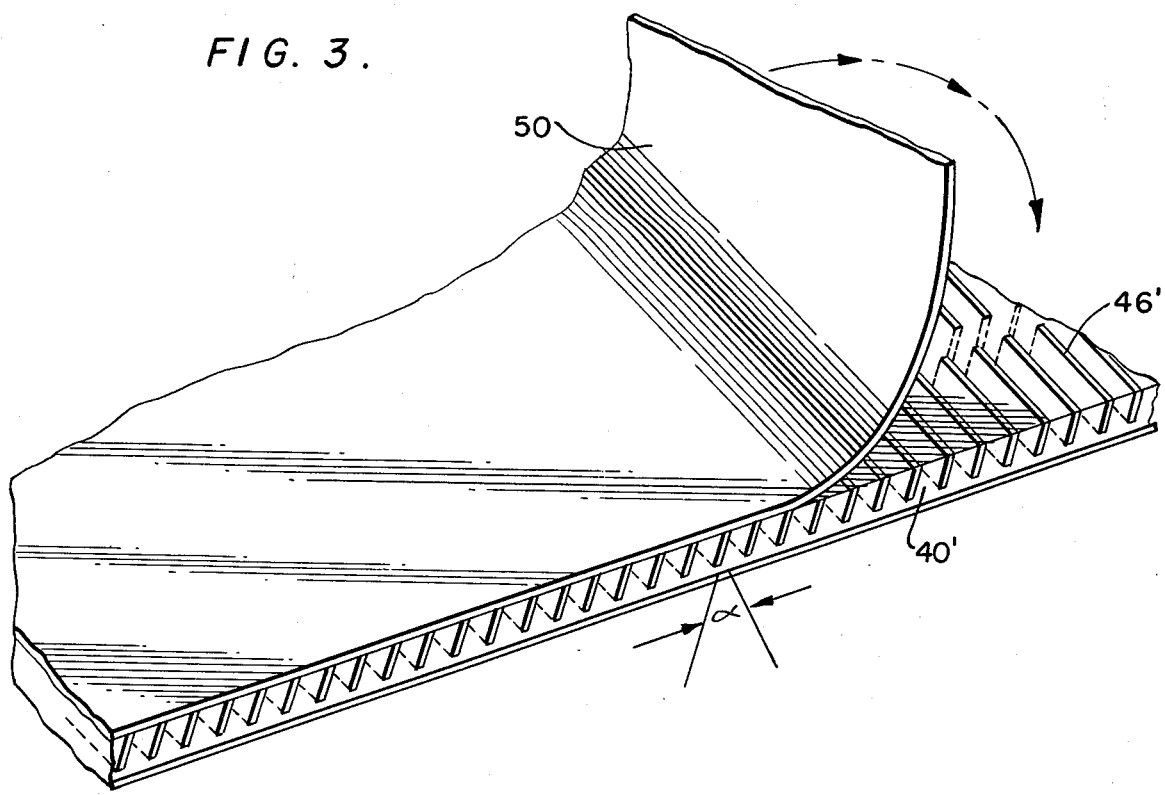
FIG. 3 is a view in perspective of the louvered sheet material carrier of FIG. 2 and a cover layer received thereon to encase the louvers; and, FIG. 4 is a view in elevation of the louvered carrier of FIG. 3 disposed between and bonded to two outer layers to form a window panel.

Reference may now be had to the several Figures of the drawings in order that the invention which generally has been discussed may be more fully appreciated.

The apparatus which may be employed in the process of formation of a louvered screen is illustrated in FIG. 1. The apparatus is denoted by the numeral 10. Certain structural features, i.e., those directly related to the process are illustrated in some detail, whereas other structural components of the apparatus which may be conventional or not directly connected to the process are generally shown or discussed, only. The process and the product formed thereby as generally brought out above is amplified below.

The apparatus includes a frame having a pair of side members 12,14 supported by stanchions or legs 16. The frame carries a bed or table 18 arranged in horizontal disposition for receipt of sections of sheet material. The sheet material serving as a carrier body may be pre-cut and through any means placed on the bed or else drawn to the bed from an endless roll 20. The bed is of a dimension to accommodate for processing a sheet having a length of nine feet and a width of five feet. During the processing operation, the sheet is retained against movement. One means to accomplish this end is to provide within the area of the bed a plurality of apertures 22 which may be communicated to a source of vacuum. The vacuum will act upon the lower surface of the sheet to hold it in place. Alternatively, suitable means on the bed, such as a frame within which the dimensioned sheet is disposed, may also be employed.

The apparatus may include either single or multiple rows of punch dies 30. The punch dies may be conventional in design and operation. Each punch die is arranged above the surface of the bed. And each punch die is of a length to traverse the width of the bed, maintaining throughout a disposition normal to the axis of the sheet. Each punch die, further, is formed of multiple die elements (not shown) for the purpose to be brought out. If punch dies in a greater number than one are employed the punch dies are equidistantly positioned along the length of the bed. In operation for punching the louver in the sheet material the bed may be advanced in stepped increments relative to the punch die arrangement or vice versa. Conventional stepping means will be employed for this purpose. The stepping action will continue until the total complement of louvers, at the desired spacing, has been punched into the sheet. Upon completion of the stepping operation, the sheet material will be replaced by a further length of sheet material and the bed or punch die arrangement will return to the initial position of the next and subsequent runs.

As illustrated, the roll 20 of sheet material is carried for rotation by a shaft 22 carried by opposed brackets 24,26. The brackets are carried by the frame. The sheet material may be drawn from the roll in the direction of the arrow and conveyed by any suitable means toward the bed upon processing demands. The sheet material is positioned for passage to the bed by the interaction of the brackets and groove 28 in the shaft. A cutter apparatus (not shown) may be interposed between the roll and the bed to sever the sheet to appropriate length or else the process may be carried out on an endless length of sheet material.

The sheet material 40 may be formed of plastic such as polyvinyl butyral, cellulose acetate butyrate or other suitable synthetic resinous material. Preferably, the sheet material will be capable of being bonded between a pair of sheets of glass or other synthetic plastic material which may be used as a glass substitute. Contemplated are glass substitutes, such as an acrylic resin, for example polymethyl acrylate, polymethyl methacrylate and the like. The sheet material should display characteristics of resiliency to receive and secure the multiplicity of louver elements substantially across its width and at spaced locations throughout its length. The sheet material, also, should be capable of being formed preferably quite thin. The invention envisions the use of a sheet of from about 0.064 inches to about 0.125 inches in thickness. Also, the material will be transparent and optically clear so as not to effect in any way the ability to pass radiation or be subject to ultraviolet problems, such as yellowing.

For the purposes of this invention it is preferred to use sheet material of polyvinyl butyral, and the invention has been carried out successfully through utilization of such sheet material having a thickness of approximately 0.094 inches.

The material for forming the louvers may be supported in a manner similar to that above. Thus, a shaft 42 and end brackets 44 mount the rolled louvered material above the frame. The material is then drawn by any convenient means (not shown) to the punch die. The material is disposed upon a plurality of rolls 46. The material preferably is of a width A which is considerably less than the width of the bed. For example, the louver segment from each roll may be from 4 to 6 inches in width or longer, if necessary or desirable. The outer edge of the material in the outer rolls is spaced inwardly from the edge of the bed. As illustrated, the inner plurality of rolls of material are also spaced from adjacent rolls. A plurality of collar elements 48 secured against shifting movement on the shaft maintain the proper spacing. In this manner, material for forming the louvers, if conveyed to the die assembly along parallel paths from the several rolls, will be punched as individual segments at spaced locations into and across the width of the sheet material.

The spacing C of adjacent segments within each row and the edge of the outer segments from the edge of the sheet accommodates any thermal expansion or contraction of the segment within the resilient sheet material body. The body serves to provide sufficient cushion of movement of the segments thereby to guard against breakage of the outer lamina because of thermal conditions and expansion or contraction of the segments. It has been found that a spacing of approximately 0.010 inches is sufficient for this purpose.

If more than one punch die assembly is utilized in the operation additional assemblies for the feeding of louver material will be provided, also.

The multiple punch die elements of each punch die receive the material, as discussed. Each punching operation contemplates sequentially severing of a length D of material from the individual rolls 46 and forcing the material endwise into the sheet material. This length may be approximately 0.062 inches. As illustrated in the Figure, the segments 46' are introduced at an acute angle $\alpha$ to the plane normal to the surface of the sheet material. Assuming use of the panel within the United States, this angle may be within the range of approximately 15°–19°. It is preferred that this angle be approximately 17°, and satisfactory results have derived therefrom.

The louver may be formed of metal, such as aluminum, steel, bronze, or copper. The material is coated, preferably black, thereby to be opaque. Any convenient coating process, such as enameling may be used. The material will be in the range of 0.002 to 0.010 inches in thickness and the spacing B of the segments of the adjacent rows will be on approximately 0.055 inch centers.

From the above it will be seen that the individual segments reside above an unpenetrated thickness of the sheet material. The unpenetrated thickness will be approximately 0.035 inches [i.e., 0.094 inches (thickness of the sheet) − 0.059 inches (0.062 cos 17° = 0.062 × .9563)].

The invention also contemplates that a louver segment as described may be punched into sheet material of a thickness to accommodate the segment within an opening cored by the insertion process. This form of the sheet may be utilized if stress of compression possibly developed internally of the sheet material by punched louvers cannot be tolerated. To this end, while the louver cores a pocket the resiliency of the sheet material will bind the louver preliminary to subsequent operations.

FIG. 2 illustrates in enlargement a broken away portion of the sheet material and disposed louvers according to the foregoing discussion and a portion of the bed of the apparatus including the apertured surface.

A further sheet 50 of polyvinyl butyral is applied (see FIG. 3) to the upper surface (and also the lower surface in the event of implementation of the discussed alternative operation) of the sheet material to encase the louvers. The applied sheet (or sheets) will be of a thickness less than the thickness of the sheet material 40. Preferably, the sheet (or sheets) 50 will be approximately 0.031 inches in thickness so that the overall thickness of the louvered screen will be approximately 0.125 inches.

Figure 4:
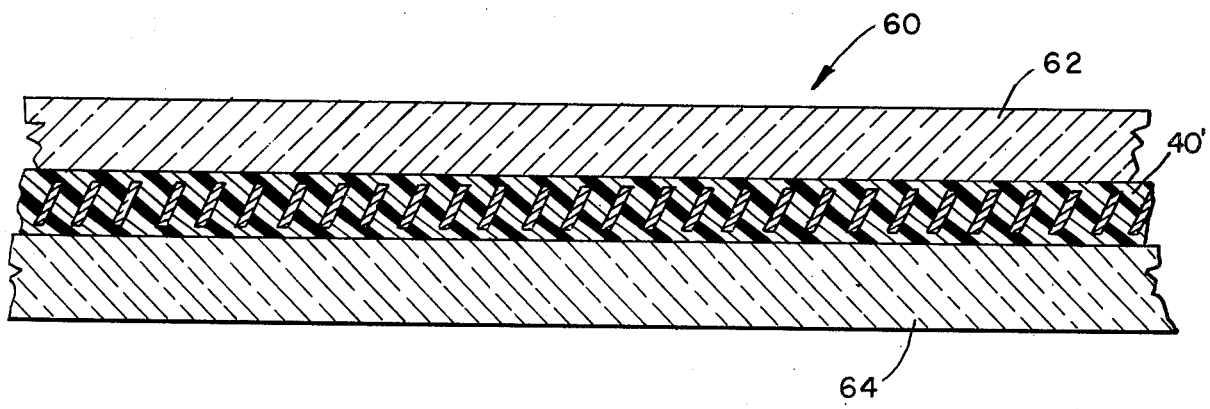

The laminate of FIG. 3 defines the central lamina layer of the FIG. 4 construction. This Figure illustrates a window panel 60 including opposed outer layers 62,64 of glass or plastic, as discussed, and the internal louvered screen bonded thereto. Bonding of the louvered screen to the outer glass or plastic layers may be carried out with precision and without critical regard to positioning of the lamina. To this end, the louvered screen is received between a pair of layers 62,64 and the package is passed between the nip of a pair of rollers (not shown). With proper pressurization the rollers will act upon the outer layers to compress the package and expel any air bubbles which may have been trapped between the layers 62,64 and the louvered screen. It is also contemplated that the package may be disposed in a vacuum bag and subjected to vacuum conditions thereby to achieve the same result. The package next is received in an autoclave and subjected both to elevated temperatures and pressure conditions throughout a suitable time period, during which the bonding of the lamina will be carried out. A temperature of about 280°F. and a pressure of about 150 pounds per square inch during a period of about 1 to ½ hours has proven sufficient to bond the lamina when introduced in batch quantities to the autoclave. To this end, the polyvinyl butyral material forming the layers of the carrier will bond to itself and to the outer layers 62, 64 of glass or plastic thereby to form a window panel.

In accordance with the invention, the optically pure panel will contain a plurality of individual louvers which, with the panel in the vertical disposition, will reflect rather than permit passage of sunlight. Yet the louvers do not adversely affect total viewing through the panel.

The process of making the louvered sun screen of this invention is extremely simple and inexpensive. The panel may be formed at what is considered a fraction of the cost of the above discussed metal sun screens. Since the panel of the present invention may be readily bonded between sheets of glass, it provides a sun screen window which does not suffer from problems attendant to accumulation of dust, condensation, or thermal problems. The panel is also an improvement over previous design in that it is not subject to problems which may arise from inaccuracies in the positioning of the several individual sheets to be bonded, or in the printing of opaque lines thereon, or in the possible uneven surface contour of individual sheets.

A sun screen window formed in accordance with this invention may readily be cut to desired size. Since there are no mullions more architecturally aesthetic design combinations of windows may be utilized. The louvers may be tinted to add greater range to design choice.

From the foregoing, it will be seen that in accordance with the present invention there is provided an improved sun screen window panel. The panel of the present invention therefore performs the objects and provides advantages heretofore not achieved on similar type devices.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. A louvered screen comprising a carrier body formed of transparent sheet material whose upper and lower surfaces substantially are continuous and throughout equidistantly spaced apart; and a plurality of opaque louver means disposed in and supported substantially stationarily by said carrier body, each of said louver means formed from at least two separate segments of material each having a substantially planar rectangular outline and a major and minor axis, said segments being positioned in the carrier body in a spaced apart discontinuous manner along their major axis, the space between said segments having nothing to impede vision through the carrier body; said louver means being spaced from adjacent louver means along a second dimension of said carrier body which is normal to said first dimension, each of said louver means being disposed at an angle acute to a plane normal to the surface of said carrier body, and said sheet material of said carrier body being of a thickness greater than the product of the length of the minor axis of said louver means times the cosine of the angle of disposition so that each said louver means is embedded within said carrier body.

2. The louvered screen of claim 1 wherein each of said louver means are equidistantly spaced along said second dimension.

3. The louvered screen of claim 1 wherein each segment of said louver means is substantially coextensive and equidistantly spaced across said first dimension.

4. A window comprising two transparent panels and louvered screen positioned between and bonded to said panels, said louvered screen comprising a carrier body formed of transparent sheet material whose upper and lower surfaces substantially are continuous and throughout equidistantly spaced apart; and a plurality of opaque louver means disposed in and supported substantially stationarily by said carrier body, each of said louver means formed from at least two separate segments of material each having a substantially planar rectangular outline and a major and minor axis, said segments being positioned in the carrier body in a spaced apart discontinuous manner along their major axis, the space between said segments having nothing to impede vision through the carrier body; said louver means being spaced from adjacent louver means along a second dimension of said carrier body which is normal to said first dimension, each of said louver means being disposed at an angle acute to a plane normal to the surface of said carrier body, and said sheet material of said carrier body being of a thickness greater than the product of the length of the minor axis of said louver means times the cosine of the angle of disposition so that each said louver means is embedded within said carrier body.

5. The window of claim 4 wherein each of said louver means are equidistantly spaced along said second dimension.

6. The window of claim 4 wherein each segment of said louver means is substantially coextensive and equidistantly spaced across said first dimension.

* * * * *